United States Patent
Clarke

(10) Patent No.: US 7,926,024 B2
(45) Date of Patent: Apr. 12, 2011

(54) METHOD AND APPARATUS FOR MANAGING COMPLEX PROCESSES

(75) Inventor: Allan Clarke, Austin, TX (US)

(73) Assignee: HyPerformix, Inc., Austin, TX (US)

( * ) Notice: Subject to any disclaimer, the term of this patent is extended or adjusted under 35 U.S.C. 154(b) by 1316 days.

(21) Appl. No.: 11/152,990

(22) Filed: Jun. 14, 2005

(65) Prior Publication Data

US 2006/0020931 A1    Jan. 26, 2006

Related U.S. Application Data

(60) Provisional application No. 60/579,330, filed on Jun. 14, 2004.

(51) Int. Cl.
*G06F 9/44* (2006.01)
(52) U.S. Cl. ............. 717/104; 717/101; 703/21; 703/22
(58) Field of Classification Search .......... 717/104–105, 717/124–135, 151–161, 120–123, 109, 113, 717/115
See application file for complete search history.

(56) References Cited

U.S. PATENT DOCUMENTS

| | | | |
|---|---|---|---|
| 5,809,282 A * | 9/1998 | Cooper et al. | 709/226 |
| 5,893,105 A * | 4/1999 | MacLennan | 1/1 |
| 5,940,815 A | 8/1999 | Maeda et al. | |
| 6,035,293 A * | 3/2000 | Lantz et al. | 707/1 |
| 6,249,905 B1 * | 6/2001 | Yoshida et al. | 717/100 |
| 6,549,890 B2 | 4/2003 | Mundell et al. | |
| 6,574,791 B1 * | 6/2003 | Gauthier et al. | 717/107 |
| 7,146,347 B1 * | 12/2006 | Vazquez et al. | 706/12 |
| 2002/0184610 A1 * | 12/2002 | Chong et al. | 717/109 |
| 2003/0233198 A1 | 12/2003 | Taguchi et al. | |
| 2004/0002827 A1 | 1/2004 | Iguchi | |
| 2004/0023405 A1 | 2/2004 | Bevan et al. | |
| 2004/0064450 A1 | 4/2004 | Hatano et al. | |
| 2004/0068560 A1 * | 4/2004 | Oulu et al. | 709/224 |
| 2004/0139042 A1 | 7/2004 | Schirmer et al. | |

OTHER PUBLICATIONS

HyPerformix Framework 2.0 User's Guide, Hyperformix inc., Year of publication: 2001.*

* cited by examiner

*Primary Examiner* — Lewis A Bullock, Jr.
*Assistant Examiner* — Paul Mills
(74) *Attorney, Agent, or Firm* — Schultz & Associates, P.C.

(57) ABSTRACT

A software program, for allowing users to manage the execution of a complex set of steps toward the solution of complex system analysis problems. The set of steps is termed a recipe. A step is a small focused task designed to accomplish a single, well-defined goal. This invention allows recipes to be easily switched, recorded and reused and for steps to be dynamically reconfigurable based on what the user does.

29 Claims, 11 Drawing Sheets

METHOD AND APPARATUS FOR MANAGING COMPLEX PROCESSES

CROSS-REFERENCE TO RELATED APPLICATIONS

This application claims priority to U.S. Provisional Application No. 60/579,330, entitled "User Interface for Managing Complex Processes," filed Jun. 14, 2004.

TECHNICAL FIELD OF THE INVENTION

This invention pertains to the technical field of software namely software to organize and streamline a methodology for solving complex tasks.

BACKGROUND OF THE INVENTION

Generally, people are often faced with performing tasks to solve problems in areas in which they are not experts. If there is a process with well-defined steps, a methodology, to attack a problem, then such a process is amenable to being represented as a recipe. FIG. 1A shows prior art technique for managing complex problems such as that presented by required network analysis of a test environment 99 on a rapid time scale. A manager 10 is responsible for collecting and organizing data information results and functions of application programs into meaningful results. In this example manager 10 is responsible for collecting and organizing production data 80 which is data collected during actual usage of test environment 99. Manager 10 is also responsible for collecting test data from various limited scope of operation test environments 30 running on system 20 with applications 25 to provide test data 40. Manager 10 is further responsible for invoking remote analysis program1 70, analysis program2 60, and analysis program3 50 to collect data, run low test scenarios and organize data into useful reports.

One example of analysis of a complex system is analysis of complex computer network, running one or more computer programs or applications forming a business system. The performance of business systems in the global economy is an area of considerable interest as businesses become more dispersed and applications become more complex. Decisions must be made rapidly and data systems must remain reliable and available. Reliability and performance can be a considerable issue in the face of rapid system or application scaling.

In this example of a complex system, a manager might be asked to optimize business applications on quite large and complex systems with perhaps many thousands of nodes that can be widely geographically dispersed. In order to meet this objective, a manager will design a test environment with actual equipment running actual business applications to be tested but on a much reduced scale from a production environment. The performance within the test environment is carefully measured and test data is recorded. The test data is used to project how the business application will perform in a more complex production or projected environment. In other situations, a system may be overly stressed, with such low business application performance that the situation is detrimental to the function of the corporation; the manager is often asked to troubleshoot the problem quickly. To accommodate the manager a methodology or series of steps must be adopted to complete the various tasks required to acquire and manipulate the test data to achieve meaningful results. Furthermore, rapidly visualizing the methodology optimizes the ability to draw conclusions and make decisions. Moreover a system which allows the methodology to be captured and reused in other situations or on other networks further enhances the usefulness of the manager.

FIG. 1B shows an example of a test environment 100 to investigate application and network performance. In the example, is a network of servers, workstations, business applications, data storage devices, test devices and IP network connections between them shown as LAN 114 and Internet 105. More specifically, the network of servers is comprised of application server 124 connected to LAN 114 which runs business, engineering or research applications, database server 120 connected to LAN 114 and which is a local database that organizes information of interest to the business, storage server 135 connected to LAN 114 and which holds a local data storage 138 that feeds the servers and to which data is backed up from the servers, remote database server 190 connected to LAN 114 via the Internet 105 and remote LAN 117 and which is geographically remote from database server 120 and serves a similar function to the local server but may house different pieces of information from different business units, and remote storage server 150 connected to LAN 114 via the Internet 105 and remote LAN 116 and which is used to keep a synchronous or asynchronous copy of the local data storage 138 to remote data storage 155. A workstation 130 is shown which runs a first application client 101 and a second application client 102; workstation 130 is also connected to LAN 114. Interspersed between the LAN 114 and the various servers are network sniffer devices 140, 144, 150 and 160. There is a network sniffer device 170 between LAN 114 and the internet 105. Network sniffer devices 175 and 185, are respectively connected between the remote data storage 155 and remote storage server 150 and between the local data storage 138 and the local data storage server 135. There is also a network sniffer device 180 between the internet 105 and remote database server 190. The network sniffers function to examine data packets as they go through the network looking for a match and logging a timestamp for each match. They will also count the number of packets that match in a given time frame and perform other such functions related to network packet timing.

The various devices shown in FIG. 1B can be logically connected to one or more analysis programs to record and organize network data. For example, analysis program1 191, is shown logically connected to storage server 135, data base server 120, application server 124 and workstation 130. Analysis programs may be configured to capture, for example, research usage of the various components of the network.

Another example is analysis program2 192 shown logically connected to sniffers 160, 140, 144 and 150. This analysis program may be configured, for example, to capture network trace data to establish flow of business process through the network. Analysis program3 193 is shown connected to internet 105 and may be configured to analyze network communications data from related components.

Another example is analysis program4 194 shown logically connected to remote storage server 150, remote data storage 155 and storage server 135. Analysis program4 may be configured, for example, to analyze the performance of each vehicle for data storage.

More generally, users run across many difficulties in following a complex methodology that are solved by standard project software, including Tracking progress over weeks or months (solved with done flags and automatic journal logging), Organizing complexity (solved with hierarchy), Understanding intermediate and longer desirable goals (solved with complete and random access to recipe),
Understanding how to manipulate many individual tools (solved by individual step kinds), Customizing a recipe for some specific use (solved by recipe editing capabilities),
Knowing the effects of iterating again through a process (solved by dynamic configuration) Reusing recipes on different problems (solved by using recipe templates).
Providing data traceability by allowing users to take a result and trace backwards through all the documents and calculations to the original data, being able to identify problems in the process that created the result. (solved by unfolding lists of steps with clearly identified dependencies describing inputs)

Obviously, a complex problem presents virtually infinite number of possibilities of ordering of steps in order to accomplish analysis of the complex process. Therefore a need exists to adopt a methodology where recipes can be used to organize and streamline the process of data collection and analysis of a complex system. The different problem domains where recipes may be applicable is varied, even though the present invention is initially targeted at data analysis.

Until the invention described herein, the processes above were performed primarily through time-consuming and error-prone manual data manipulation by skilled performance engineers. This invention automates much of this process, thereby reducing the time required and improving the accuracy in solving complex problems.

SUMMARY OF THE INVENTION

The present invention is designed to allow users to follow a series of steps to achieve a goal. Steps that are designed to accomplish a common set of goals are termed a recipe. A recipe is the codification of a methodology.

The simplest possible recipe would be a linear series of steps which act as a simple check list. There would be no active support given to the user beyond the "done flag" that is set on each step that is completed. Such an overly simplistic recipe is composed strictly of passive steps; the step has textual description information describing the user actions that the user needs to take, but there is nothing beyond that.

More useful recipes would also contain active steps. Such steps not only inform the user of what needs to happen, but also controls other programs to actually perform work on behalf of the user. Sometimes these steps require extra information before they can be completed; accordingly there may be a user interface, like a dialog, to gather this data from the user.

Still more useful is the ability to organize steps in a hierarchy, like an outline. Similar steps are grouped under a more abstract step description. The minimal taxonomy of steps is then; passive steps, active steps, and steps which form step topology (like hierarchy or iteration).

Typically recipes are used in solving problems which involve transforming data. Data might be collected in a raw form, converted, and analyzed to glean higher-level abstractions. Different steps might perform some of these tasks. The steps are related sequentially and functionally in that the results of a step might be used as inputs to some later steps. Thus recipes support a data-driven concept in the invention whereby the "outputs" from some step are automatically (or manually) plugged in as "inputs" to some successive steps.

As a user works their way through a recipe toward completion, filling in information and executing steps, the overall state of their recipe may change.

Using object-oriented technology, steps are well-formed and have a strict interface with a container called a recipe. Steps may be developed independently and dynamically added within the invention.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments described herein are merely illustrative of specific ways to make and use the invention and do not delimit the scope of the invention.

Figure 1A:
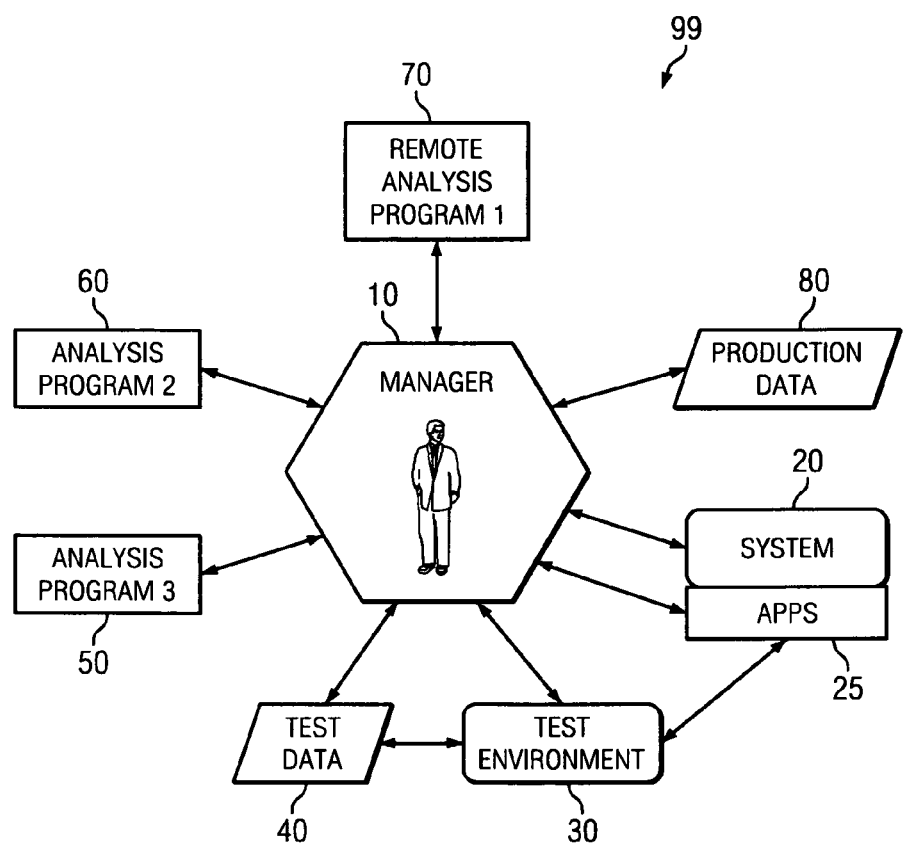
FIG. 1A is a schematic illustration of a prior art method of analysis of a complex problem.
Figure 1B:
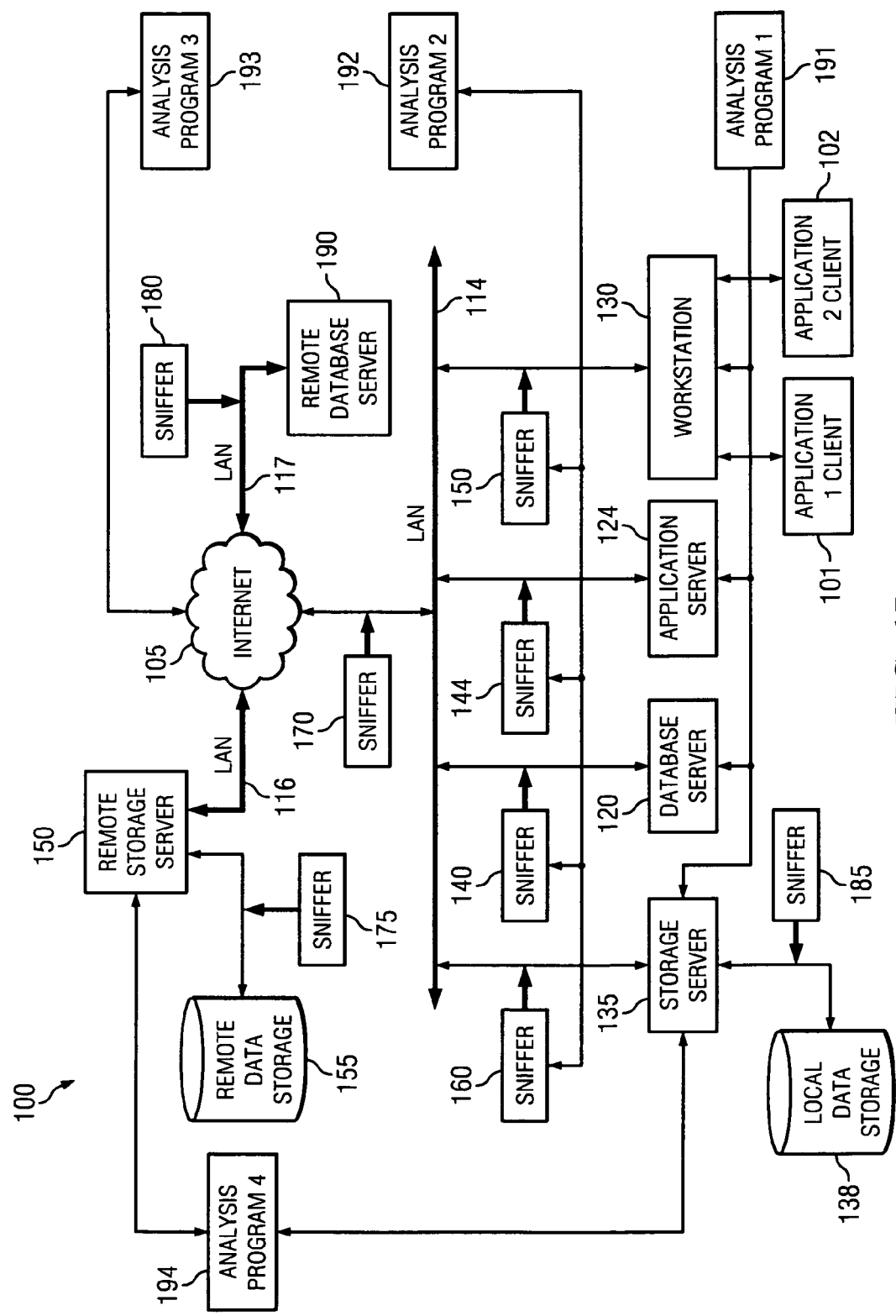
FIG. 1B is a schematic illustration of a complex process.
Figure 2:
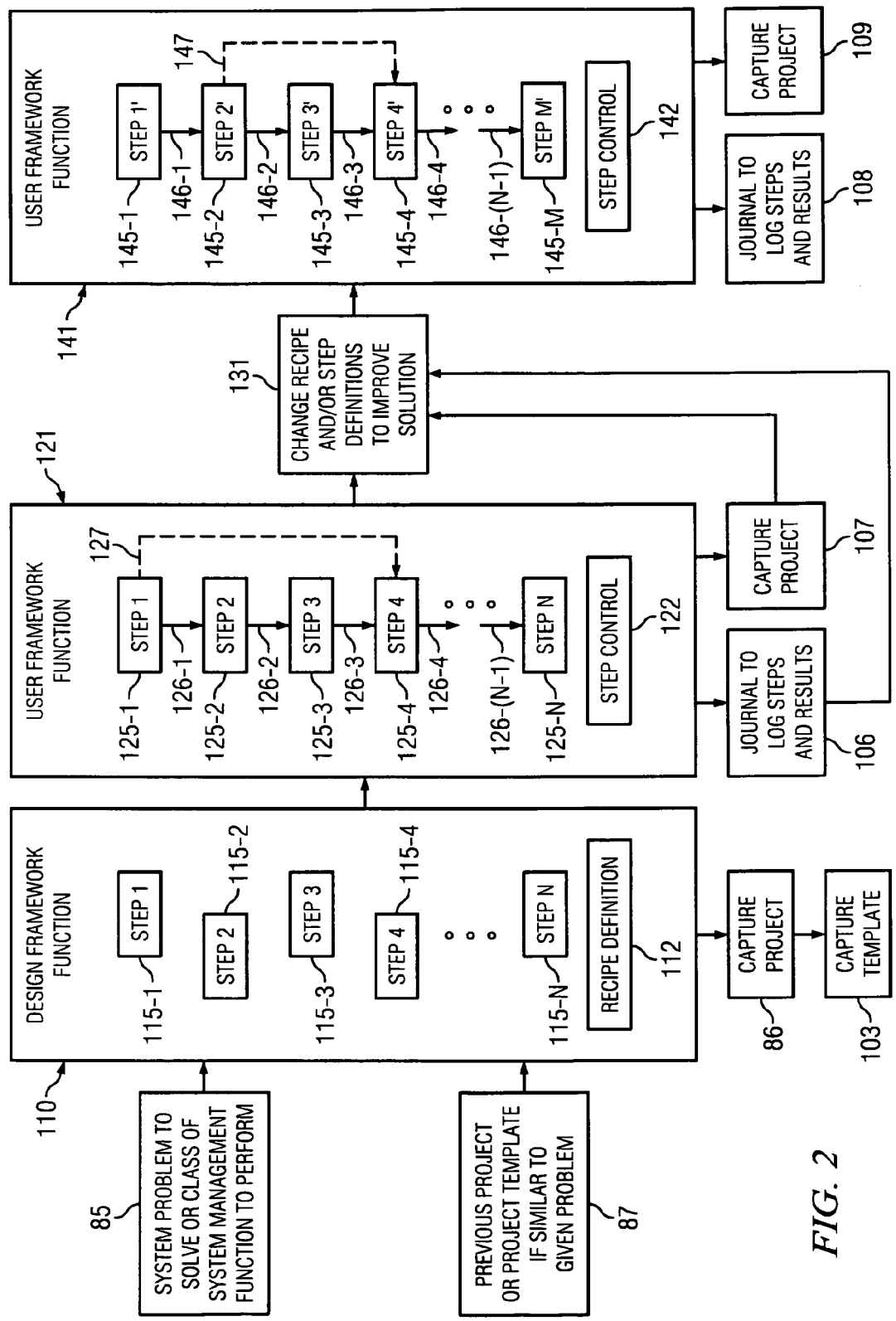
FIG. 2 is a block diagram showing the function of the present invention.

Referring to FIG. 2, the primary function of the present invention is to efficiently take a system problem 85, design a recipe of required steps for problem solution in a design framework function 110, use the recipe in a user framework function 121 for executing and exchanging information with steps, alter the recipe design or recipe parameters in a change process 131 and then use the altered recipe to obtain improved solutions to the system problem in a subsequent user framework function 141. Arrows signify process flow in FIG. 2 unless specifically designated otherwise below. A recipe is defined as a collection of known steps placed in a known order of operation in what follows.

System problem 85 can be of the nature of a systems performance engineering problem, for example, where data is collected, analyzed, utilized to adjust a system, and the performance is validated thereafter. As another example, the system problem may be a class of complex system management functions that need to be performed on a regular basis.

Figure 8:
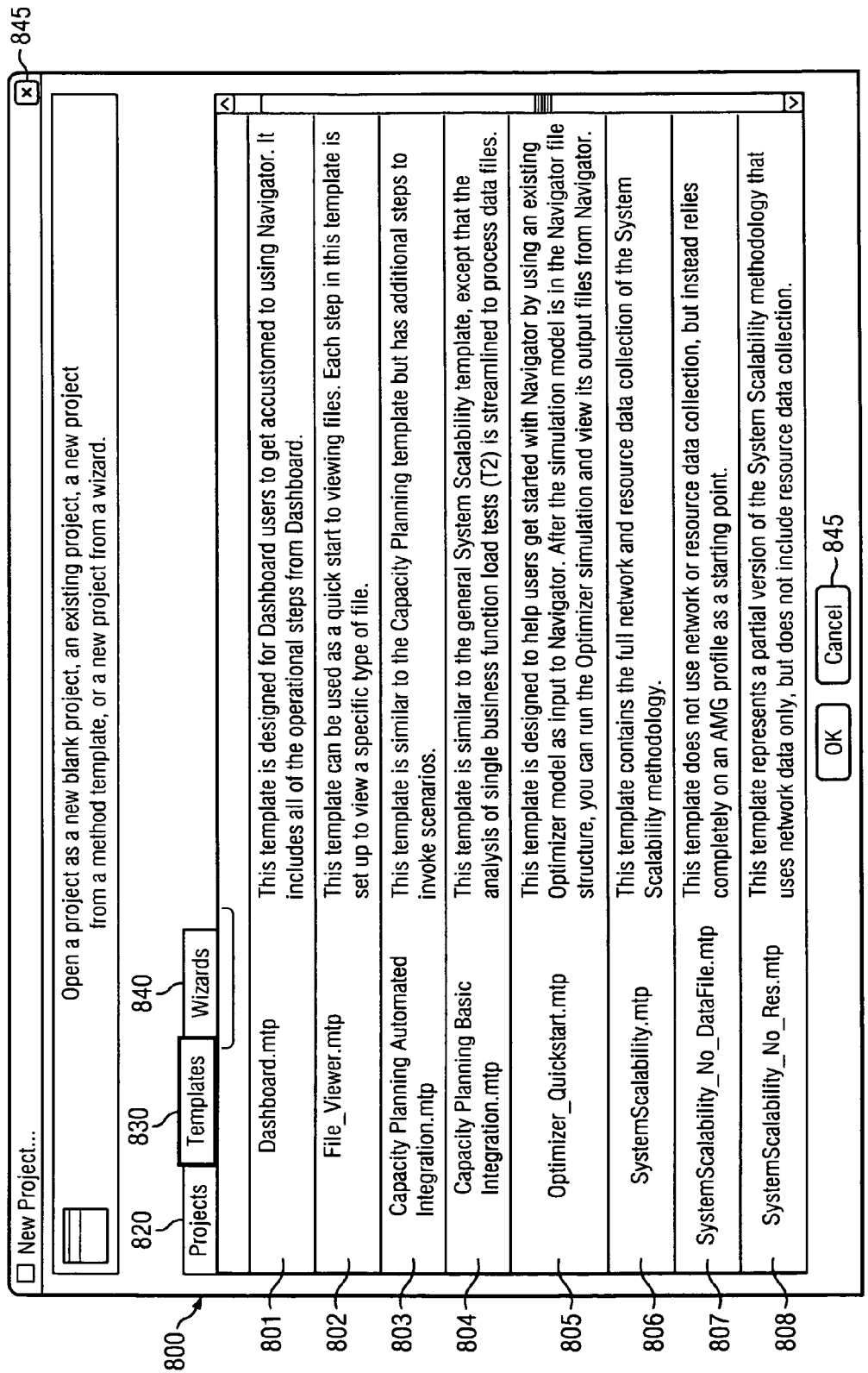
FIG. 8 is a screen shot from a computer display illustrating templates in the preferred embodiment of the present invention.

Design framework 110 is a process that utilizes a recipe definition means 112 for allowing a user to easily define and organize a collection of N steps, step 115-1, step 115-2, step 115-3 to step 115-N, steps 115 into a recipe which is used to affect a solution for system problem 100. Steps 115 are entities with prescribed behaviors that are capable of executing a defined task. The definition and organization of steps will be described in more detail below. Recipe definition means 112 is a container for the step entities capable of taking pre-defined project files or templates 87 to rapidly construct a recipe from a previous project. Additionally, design framework 110 can save project information by a capture project function 86 which may also be used to capture templates through a capture template function 103. Project information contains all of the information including the project recipe and other relevant information such as step definitions, data, data pointers, user input, etc that may be contained within the design framework to support the recipe. Template information is information that is created by stripping the problem specific data out of the project and saving the recipe of steps only. In the preferred embodiment, templates are stored as XML files. An example of pre-defined templates, also in the preferred embodiment of the present invention are shown in FIG. 8 and described below.

User framework function 121 is a process that utilizes a step control means 122 to execute a recipe of N steps: step 125-1, step 125-2, step 125-3 to step 125-N. There is 1:1 correspondence between steps 115-1, 115-2, . . . , 115-N and steps 125-1, 125-2, . . . , 125-N, respectively, in FIG. 2. The steps 115 which were previously defined and organized into a defined flow process by the design framework 110 execute linearly as steps 125 in the order indicated by solid process flow arrows 126-1 to 126-(N−1), i.e. step 125-1 runs then passes control to step 125-2, step 125-2 runs then passes control to step 125-3, and so on to step 125-N. The information flow between steps 125-1, . . . , step 125-N happens to be linear where the output of one step is the input to the next step. The dashed arrow 127 specifically indicates that information flow has been defined and is occurring between step 125-4 is deriving its input from step 125-1 within the user its input from framework 121. Information flow into and out of steps will be described further below.

Change process 131 is accomplished rapidly and easily in the present invention. Saved projects from the capture project function 107 are used to re-design recipes in other instances of the design framework function to improve the overall solution to system problem 85. Alternatively, within subsequent user framework functions, recipes may be simply and quickly changed utilizing new parameters within the steps to improve process results. For example, the information flows, step behavior and numbers of steps in the recipe of user framework 141 may be different than the information flows, step behavior and number of steps in the user framework 121. User framework function and design framework function can be very closely related within the present invention. A user, while executing a recipe, may stop the process, insert a step, then continue to effect a dynamic configuration of the recipe. Moreover, the user can save dynamic configurations as projects or templates to capture new recipes while creating notations using the journal functions to capture knowledge of why new steps were added or their parameters changed.

User framework 141 is a process that utilizes a step control means 142 to execute a given recipe of M steps: step 145-1, step 145-2, step 145-3 to step 145-M. The steps 145 are organized into a defined flow process whereby the steps execute linearly in the order indicated by solid process flow arrows 146-1 to 146-(N−1), i.e. step 145-1 runs then passes control to step 145-2, step 145-2 runs then passes control to step 145-3, and so on to step 145-M. Dashed arrow 147 specifically indicates that information flow is occurring between step 145-2 and step 145-4 within the user framework 141 which is different than the information flow in user framework 121 from which user framework 141 was derived.

User framework 121 (or 141) also takes pre-defined project files or templates (not shown) to rapidly load a recipe from a previous project. Alternatively, user framework 121 (or 141) may save its current project state by a capture project function 107 (or 109). Project information contains all of the information including step definitions, data, data pointers, user input, execution state, etc. that may be contained within the user framework to support the project. User framework 121 (or 141) includes a journal function 106 (or 108) to automatically log steps activity as the recipe executes or allow a user to manually log steps activity and other information into a written account of the process so that specific knowledge for decision making can be captured during the recipe execution.

In the preferred embodiment, the recipe definition means 112, step control means 122 and step control means 142 are a shared common resource within the overall program structure which will be referred to as a system project organizer program. The shared common resources for building and executing steps will be described in more detail in conjunction with FIG. 4 below.

The implementation of the process in the preferred embodiment is accomplished using a set of Java applications in a Java application framework that interact together to produce the overall program. The Java applications code exists in the host computer memory and runs on the host computer's CPU (or multiple CPUS) utilizing the various resources of the computer, including computer memory, hard disk drives, graphics display units and network interfaces. The Java applications code may also utilize resources attached to a network connected to the computer such as application servers, storage servers or database servers. Other embodiments may use other object oriented programming languages, or structured languages, or hard coding in firmware, or some combination to implement parts or the whole of the present invention. As is well-known in the art of computer programming, objects generated within an object-oriented language may encapsulate data structures and may contain methods to manipulate those data structures and perform other operations. Objects and modules will refer to entities that contain data structures and that may contain executable code to perform operations on those data structures. A program in this document refers to certain combinations of objects (or modules), the logical information flow between the objects, and the process by which the objects interoperate to perform the functions described in FIG. 2.

Figure 3:
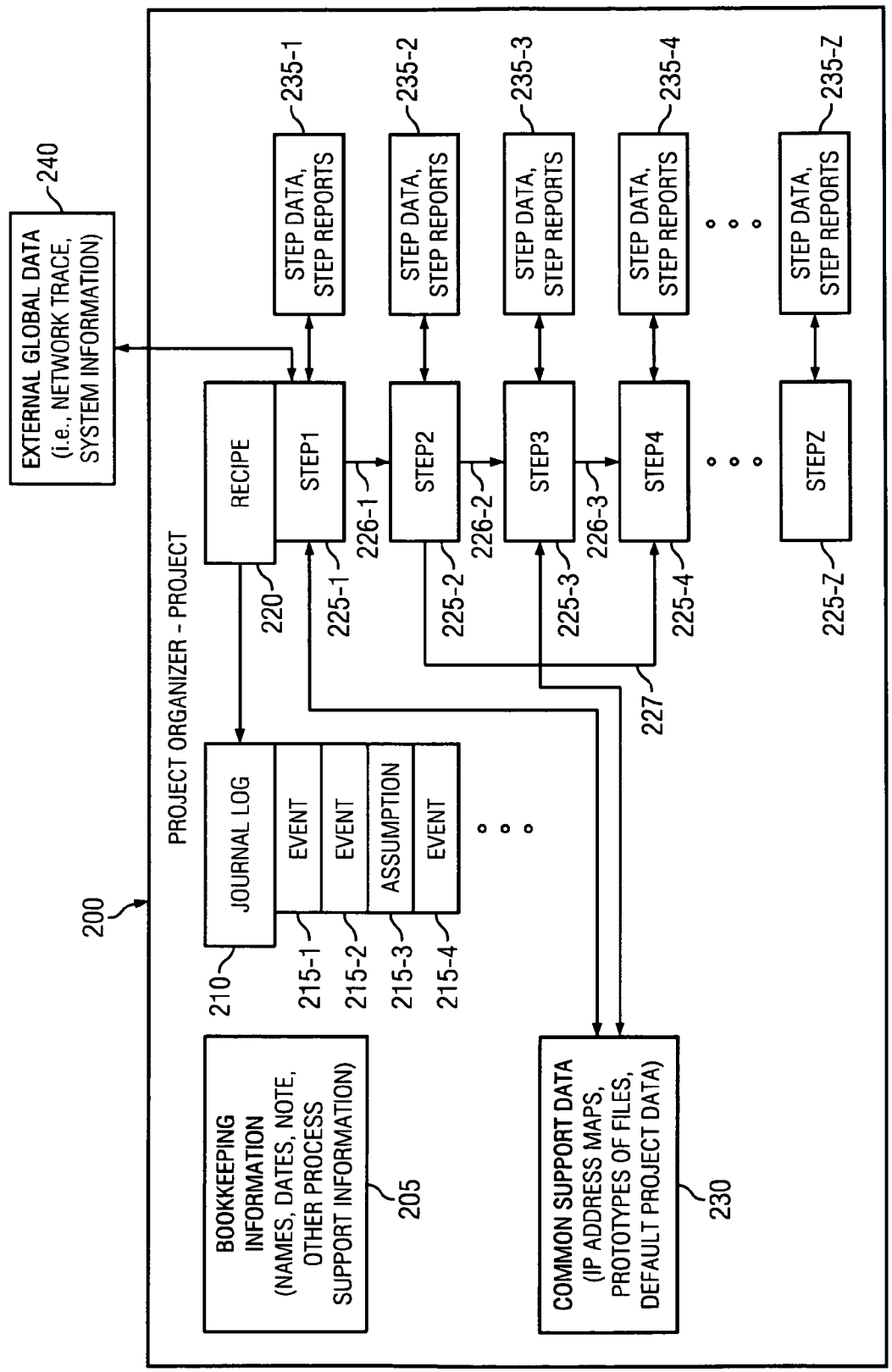
FIG. 3 is a block diagram showing the logical data composition of the present invention.

FIG. 3 shows the logical data composition of the system project organizer program. A system project organizer 200 is a data structure composed of bookkeeping information 205 which contains project level information, a journal log 210 which contains journal entries, a recipe 220 which is a collection of steps, common support data 230 for supplying the project with common system data, and step data function 235 which holds step information. External global data 240 is also available to the system project organizer 200 as a source of data. Connections within the diagram of FIG. 3 are designated by dashed arrows and indicate information flow between the relevant objects.

Recipe 220 is the core structure of system project organizer 200 since the system project organizer program is primarily concerned with the definition and execution of steps within recipes. Recipe 220 is constructed of step 225-1, step 225-2, ..., step 225-Z where Z where the number of steps Z is definite at a particular point in time for a project and is limited only be the available memory or data storage in the host computer. The recipe 220 has been constructed such that information has been arranged to flow from step 225-1 to step 225-2, step 225-2 to step 225-3, step 225-3 to step 225-4 and so on. Step 225-4 also gets information from step 225-2 at run-time when step 225-4 initializes and executes. In the preferred embodiment, default information flow is defined such that output of a given step is matched to the next step in-order whose input type matches the output type of said given step. The information may be explicitly connected between the output of a step and the input of a subsequent step by the recipe designer as in FIG. 3, information flows 226-1, ... 226-3. A given step may be designed to explicitly get its information flow from any of the previous steps as long as the output type of the previous step matches the input type of the given step as shown in FIG. 3, information flow 227.

The steps 225 encapsulate run-time methods for execution in addition to run-time information about their properties and data sources. Steps 225 have associated step data repositories 310 for specific step property information and for reports that form input and output data used and generated, respectively, by the particular step.

In particular, step 225-1 is associated with step data function 235-1, step 225-2 is associated with step data function 235-2, ..., and step 225-Z is associated with step data function 235-Z. At application run-time the associated step properties are gathered from the step data function 235 into steps 225 so that they may be viewed on a screen within the system project organizer program and so that the user may input data or interact with the step in other ways. Application data for some steps, namely step 225-1 and step 225-3, are also gathered from common support data 230 (examples of common support data are prototypes of files, default project information and maps of machine names to IP addresses). At step execution run-time the associated executable methods are loaded into the step as well as other run-time information (e.g. input data from another step) that is necessary to execute the step. Step construction and execution will be explained more fully in the description of FIG. 4.

Continuing with FIG. 3, steps 225 within recipe 220 may also access data from external global data 240. External global data 240 is a set of data or connections to devices pertaining to the system under study. Examples in the preferred embodiment include such as network trace information, system information, servers running performance programs, measuring devices and their output and simulator devices and their inputs or outputs. External global data 240 may be geographically remote from the location where the program is running as the information flow may be accomplished, for example, via IP protocol over the public internet. Steps 225 may gather static data or dynamic data from external global data 240. Static data is in the form of text files, spreadsheet files, database files or XML files that reside in some location and are transferred upon request by a step 225. Dynamic data is generated by the interaction of a step directly with a measurement device or program. For example, step 225-1 looks up the IP address of a certain Ethernet packet sniffer device using common support data 230. Step 225-1 then sends a command to the Ethernet packet sniffer device to make a series of measurements and send back the results. The Ethernet packet sniffer then makes the measurements and sends the result back to step 225-1 in the form of an ASCII text string.

As steps 225 execute within recipe 220 information from each step about the nature of that step and whether it successfully completed is sent to journal log 210 for logging as an event. Journal log 210 organizes the series of events 215-1, 215-2, 215-4 and so on as they arrive into a tabular form for the user to see. Each entry in the table has an entry name, date/time, category of information, and a text description of the entry. All entries in the journal log 210 are time stamped as they arrive or are entered. In addition to automatically logging events from recipe 220, journal log 210 has a user input means (not shown) for allowing users to write their own journal entries and select a category for the entry, for example, assumption 215-3 in FIG. 3 which describes a certain assumption that the user made, say, in setting the parameters within a step. In the preferred embodiment, journal log 210 prescribes categories: "assumption", "concern", "conclusion", "data", "event", "goal", "model change", "model implication", "note", "result", "revision change", "sensitivity analysis", "to do". Other embodiments may extend the list of categories or allow additional columns of information. The journal log 210 supports a sort function to sort entries by name, data/time, category or description.

Bookkeeping information 205 is a repository of descriptive data about the system project organizer 200. It contains information such as the user name, the date the project was created, the last date it was manipulated and other process support data such as the location of external project files and template files.

Common support data 230 holds default information for system project organizer 200. It contains information such as IP address maps, prototypes of files for step input and output, location of project specific files and data, and default properties information to populate new steps.

Figure 4:
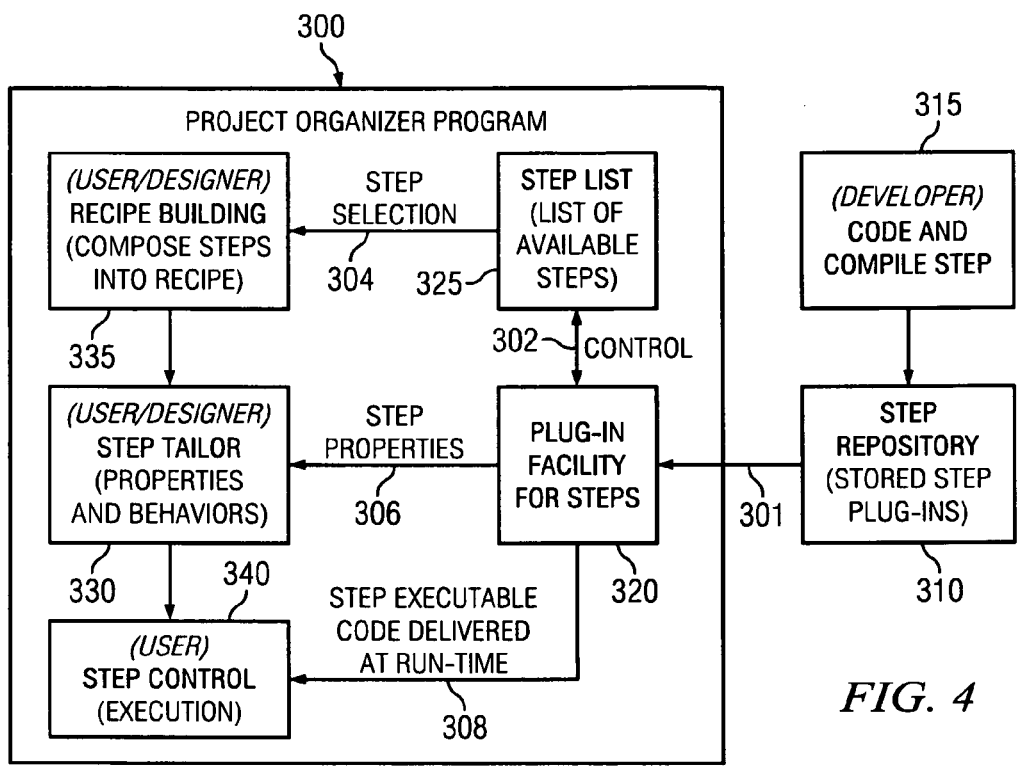
FIG. 4 is a block diagram showing STEP construction and execution within the preferred embodiment of the present invention.

FIG. 4 shows the shared step construction and execution resources within the project organizer program 300. Project organizer program 300 is comprised of a step tailor function 330 for setting step behaviors and properties, a recipe building function 335 for organizing steps into a recipe, a step control function 340 for executing steps, a step list 325 from which a recipe can be constructed, and a plug-in facility function 320 for manipulating steps and their properties into the project organizer program 300. Step tailor function 330 and recipe building function 335 together form the resource for the recipe definition function 112 within the design framework function 110 previously described. Step control function 340 is the resource for step control functions 122 and 142 described previously; it provides the execution context when the steps are instantiated through their interfaces.

A step class exists for defining the services supplied by all steps. The step class has a varying number of sub-objects that define input and output data types and it contains a display object. All steps that are created in the step tailor function 330 derive from the step class. Behavior which varies between steps is part of a derived step; common behavior is inherited from the base step class. Derived behavior includes the number and types of inputs and outputs, edit dialogues for step properties and the behavior that results when the step is executed. Step tailor function 330 provides facilities through the project organizer program 300 for a user to carefully and distinctly prescribe the derived behavior of each step in a recipe.

Sub-classes of steps are coded and compiled by a developer in the code and compile function 315. Certain behavior constraints and properties are built into step sub-class that makes the step sub-classes functionally distinct from one another. One role of the code and compile function 315 is to program the distinctions between sub-classes. Another role of the code and compile function 315 is to codify the specific executable behaviors of a step sub-class, so that when a step instance is realized and the properties are defined within in it in later (recipe build function 335 and step control function 340), it executes its coded behavior in conjunction with those properties (e.g. an input file name and location).

Step sub-classes are stored in a step repository 310 for use by the project organizer program 300 and more specifically the plug-in facility function 320. In the preferred embodiment, the Step repository is a jar package within a Java application framework.

Plug-in facility 320 functions to make step sub-classes available for design and for execution by the project organizer program 300. Plug-in facility 320 is a module with an external interface 301 connected to step repository 310, control interface 302 connected to step list 325, step design interface 306 connected to step tailor function 330, and step execution interface 308 connected to step control 340. In the preferred embodiment, plug-in facility 320 loads a list of step sub-classes for step list 325 and will create a step sub-class instance with its properties for step tailor function 330 based upon user selection of a step sub-class within step list function 325. At run-time, step control 340 will request a step execution from plug-in facility 320 which functions to execute the step object and run the step.

Step list 325 functions to gather information about the available step sub-classes from plug-in facility 320, especially the presentation names of the step sub-classed and list them in a column in sorted order so that a user can choose from the list. The user chooses a step from step list 325 by clicking on an item in the list. The step list 325 functions to respond to the choice by contacting plug-in facility 320 to signal that a step sub-class has been selected for insertion and signals which step sub-class has been selected. Step list 325 is also connected to recipe builder function 335 via selection 304 so that a step may be selected in the recipe design mode for insertion into a recipe. A computer screen shot example which includes a visualization of step list 325 is given in FIG. 9C as step list window 951 on the right side of the figure.

Recipe builder function 335 serves to provide the user with a display of and mechanism for arranging and connecting the steps together into a well-defined order. In the preferred embodiment the user will migrate seamlessly between the recipe builder function 335, step tailor function 330 and step list 325 to build the recipe and its component steps. The primary representation of a recipe within recipe builder function 335 is a tree. A tree is a user interface that supports hierarchy of parents and children. The tree supports collapsing and expanding of branches so that steps may be organized into primary steps (parents) and sub-steps (children) of (i.e. closely related in functionality to) the primary steps. Recipe builder function 335 assigns a step birth-order to the step and an execution order to each step and maintains the current ordering of the hierarchy of steps.

Step tailor function 330 provides a mechanism to set a step's behavior by opening a properties window with various tabs relating to the various possible functions of the step. The properties window is defined within the step sub-class, so that step tailor function 330 must receive the step sub-class from plug-in facility and open a properties window according to the structure within that sub-class. In the preferred embodiment, the step tailor function 330 is responsible for populating the instance of the step with the user supplied information (e.g. input file selections, output folder location, or radio button behavior) gathered from the properties window. The step as defined is subsequently stored in the previously described step data function 235 associated with that step.

In the preferred embodiment, the properties window associated with a step comes into two different forms: a design form and a user form. The design form allows a designer complete access to all step behaviors and properties while the user form allows only a reduced selection of behaviors and properties, i.e. those properties required to run the step. The appropriate window is opened based on whether the user is in design mode or user mode of operation.

All required input data sources must be included to define the step's behavior. An input selector is available in the properties window to accomplish the selection of input data sources for a given step. Input files are typically output files from other steps in the recipe and are automatically named by those step control function 340. A useful feature of the preferred embodiment of the present invention, is to allow the user to define a tracking label and associate it with each output file. The tracking label is a text description of the file and is not the file name. The tracking labels appear in the input selector of the step properties window so that a user can easily and accurately distinguish which files to select as input for a given step.

Step control function 340 controls the execution process of steps. Step control function 340 also serves as a "traffic director" for information flow between steps, specifically examining the properties of each step before it executes to connect it with the appropriate input data source. The step control function 340 uses the recipe tree from recipe builder function 335 to allow interaction with the steps by the user to (1) execute the steps one by one in a manual fashion, (2) execute the steps in a completely automatic fashion, (3) execute the steps in a semi-automatic fashion where a parent branch or some other portion of the tree is selected to execute automatically but not the entire tree, (4) open a step tailor function 330 window in user mode, to set parameters in the step. In manual mode (1), the user works their way down the recipe tree, filling in information as requested by steps and executing steps. The overall configuration of the recipe is dynamic and may change as the user interacts with step control function 340 during use time. For example, a recipe may denote that a sequence of three steps needs to be done for each item of a list containing three items. If the user goes into step tailor function 330 window as in the fourth option above, and the user adds a new member to the list of items, step control function 340 gives control to report builder function 335 to add the new sequence of steps which are explicitly associated with the new item list. When program control is returned to step control function 340, the user may then execute the steps in sequence.

In cases where a multiplicity of input files of the same type are defined to be processed by a step that was defined with one input initially, step control function 340 will indicate a repetition count on the display of the step and upon executing the step, will repeat execution for the given multiplicity of files supplying the correct input file and a corresponding unique output file (or set of files) for each step execution each time the step executes. The repetition is done under step control function 340 without a change in the design or definition of the step that was repeated.

Figure 5:
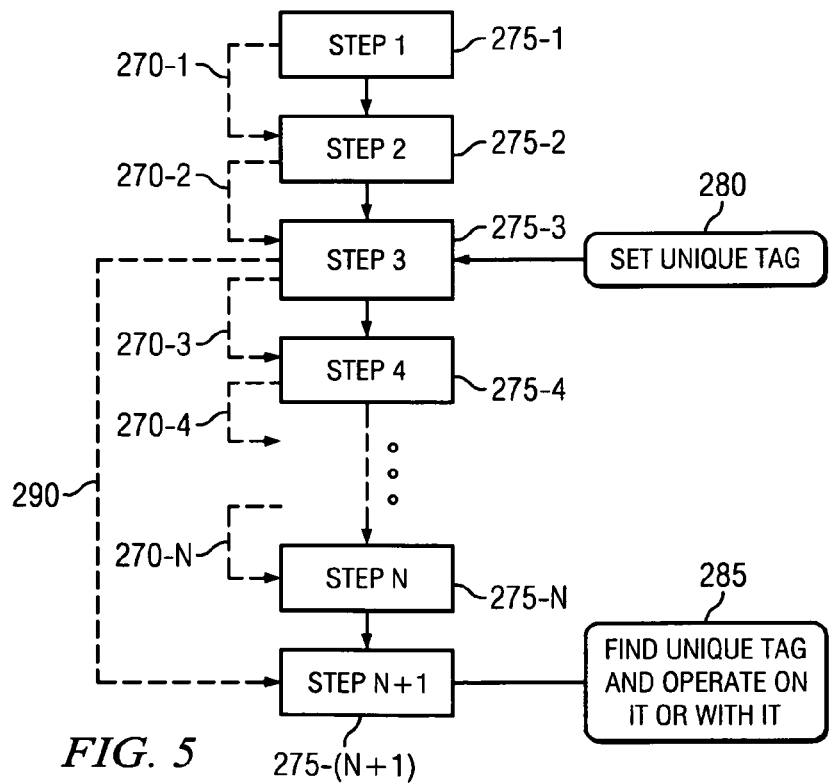
FIG. 5 is a flow diagram of STEPS that illustrate a tagging mechanism within the preferred embodiment of the present invention.

Step control function 340 manages other dynamic dependencies between steps related to information flow. As steps are executed, output files are expected to be generated that generally form input files for subsequent steps in the recipe.Step control function 340 examines the return codes from the applications that created the output files and/or checks the validity of the output file by looking for the existence of the file and its time stamp order in relation to other input files to ensure that the file is suitable for further processing by the next step. If the file is found to be suitable, then step control function 340 marks a graphic representation of the output file on the step's visible display with a green checkmark; if the file is found not to be suitable then step control function 340 marks a graphic representation of the output file on the step's visible display with a red X and the recipe is not allowed to execute beyond the first step that requires the unsuitable X-marked output file as input. If the file was suitable at one time but is no longer suitable, such as the case where a step depends on inputs from several other steps whose output has changed and needs to be updated, then a red checkmark is displayed indicating that input data is "out-of-date". p A specific tagging behavior of steps is discussed in relation to FIG. 5 that further restricts the default information flow behavior and illustrates dependency management as previously described. In that figure, a recipe is comprised of steps, step 275-1, step 275-2, . . . , step 275-N, step 275-(N+1) and is defined in a certain execution order shown by solid arrows with information flow between steps shown by dashed arrows 270 and 290. Information flow 270-1 describes information that flows between step 275-1 and step 275-2, information flow 270-2 describes information that flows between step 275-2 and step 275-3, and so on. Information flow 290 describes information that flows between step 275-3 and step 275-(N+1). An example of information would be modification of data in a table or collection of data inserted in a table for future use. A set unique tag event 280 and find unique tag event 285 is displayed in conjunction with the operation flow of the recipe to be described further.

A mechanism which is a part of the step control function 340 in the preferred embodiment is now described for tagging the information from a particular step for later use by another particular step. A user while using the step control function 340, works their way through the steps in a recipe tree. Upon executing step 275-3, the user decides that the output data is particularly relevant to a later step and of the correct type, for example, steps 275-1, 275-2 and 275-3 may have generated similar data, but the user values the result from step 275-3 above the results from step 275-1 or step 275-2. In a set unique tag event 280, the user selects a button from the display of step 275-3 to tag step 275-3 with a piece of text code, for example, the word "GOLD"; step 275-3 displays a text box, the user types in "GOLD", exits the text box and proceeds to work on the step 275-4, step 275-5 and so on. When the user completes step 275-N, the step control function 340 is ready to connect step 275-(N+1) with its input data source. In find unique tag event 285, step 275-(N+1) is explicitly programmed ahead of time by step tailor function 330 to find the data with the unique tag "GOLD" and operate on it. Step control function 340 knowing that the "GOLD" data is from step 275-3 and verifying that the input and output types match, provides the corresponding input file location to step 275-(N+1). Step 275-(N+1) proceeds to get the data and operate on it.

Table 1 shown below indicates the basic functions that all steps must execute as an interface in order to belong to the recipe container. This behavior is inherited from the primary "step" class described previously in the code and compile step process 315. In some cases, steps may be designed to override the inherited class behaviors.

The step functions are explained as follows: Table 1: Line 1 indicates that a LOAD step functions to make itself known within the project organizer 400 environment to be used by recipe builder function 320 and step tailor function 330 and load a set a default properties for same. Table 1: Line 2 indicates that a CREATE INPUTS step functions to define its input types and name its inputs making them known to project organizer program 400 and moreover, opens a path to specific inputs based on its defined data sources upon request by step control function 340. Table 1: Line 3 indicates that a CREATE OUTPUTS step functions to define its output types and name its outputs making them known to project organizer program 400 which in turn makes them know to other steps within the recipe. The step is responsible to open a path to its output upon request. Table 1: Line 4 indicates that a SHOW EDIT DIALOGUE step functions to define its available edit mode properties and to provide its properties information to a user working in edit mode for manipulation. Table 1: Line 5 indicates that a DISPLAY YOURSELF step functions to provide a visual display of its various controls including the steps visual window properties, controls, buttons, lists, dialogues, and other visual information that aids the user to understand the step and interact with the step. Table 1: Line 6 indicates that a GO step functions to define its behavior when executed and that it executes utilizing the resources within the project organizer program 400 according to a taxonomy of behaviors to be explained in Table 2.

TABLE 1

| FUNCTION | DESCRIPTION |
|---|---|
| 1 LOAD | initialize and signal project organizer |
| 2 CREATE INPUTS | input names, input types, |
| 3 CREATE OUTPUTS | output name, output type |
| 4 SHOW EDIT DIALOGUE | edit step properties |
| 5 DISPLAY YOURSELF | send visual frame properties. |
| 6 GO (EXECUTE) | operate on inputs to create outputs |
| 7 SHOW DESIGN DIALOGUE | edit detailed step properties |
| 8 READ & WRITE TO PROJECT FILE | transfer object state to project file |

Line 7 indicates that a SHOW DESIGN DIALOGUE step functions to define its available design mode properties and to provide its full range of properties information to a user working in design mode for manipulation. Examples of properties are display window appearance, step name, tags, pause messages, inputs, outputs, and custom information related to the specific step class and design. Table 1: Line 8 indicates that a READ AND WRITE step functions to read and write itself, i.e. its current state to a project file for later use by the project organizer program 400 or so that the project organizer program 400 may suspend execution of a recipe, close, and open at a later time to continue execution of the recipe. The list of step functions so described are the basic functions within the preferred embodiment of the present invention. One of the goals of the present invention is to provide an extensible functionality of steps. While the list of basic step functions in Table 1 are required for operation within the preferred embodiment, many other step functions are conceived, created and utilized within the present invention and within the preferred embodiment of the present invention as evidenced by the step list example 950 shown in FIG. 9C.

Table 2 indicates the taxonomy of steps in the preferred embodiment of the present invention. The classes of steps form step sub-classes described previously in the code and compile step process 315.

TABLE 2

| CLASS | FUNCTION |
|---|---|
| 1 STATIC | display text only |
| 2 DATA DEFINITION | get user input only |
| 3 ITERATION CONTROL | flow control mechanism |
| 4 ACTIVE (non-interactive) | calculate outputs given inputs (passive user) |
| 5 ACTIVE (interactive) | launch application, send input, get output (active user) |
| 6 DATA SOURCE | define input data source |

Table 2: Line 1 indicates that sub-class of STATIC steps are defined and utilized within the present invention for displaying a text or bullet list output to the visible output. A STATIC step has no inputs or outputs to be defined. Table 2: Line 2 indicates that sub-class of DATA DEFINITON steps are defined and utilized within the present invention for allowing a user to expressly and manually input data to be stored and used by subsequent steps or processes. Examples of manual input data are a number, a table, a textual data, and user constraint data. DATA DEFINITION steps are not active with other applications, but can make their data available via defined outputs. Table 2: Line 3 indicates that a sub-class of ITERATION CONTROL steps are defined and utilized within the present invention for performing flow control mechanisms within a recipe. Example defined flow control steps that are members of the ITERATION CONTROL sub-class are "For each", and "For each file" which spawns a series of steps for every item list in the "For each" or "For each file" structure. Table 2: Line 4 indicates that a sub-class of ACTIVE (NON-INTERACTIVE) steps are defined and utilized within the present invention for taking data from one or more defined inputs, performing calculations on the data from the defined inputs, and creating one or more outputs. ACTIVE (NON-INTERACTIVE) steps do not interact with the user, i.e. they perform the calculations and deposit the outputs, without user intervention. Example input is a spreadsheet file such as a standard .csv file taken from another file server on a local area network. Example output is a text file written to the local hard disk storage device. Table 2: Line 5 indicates that a sub-class of ACTIVE (INTERACTIVE) steps are defined and utilized within the present invention for taking data from one or more defined inputs, signaling and launching (if necessary) an external application, loading data into the external application, checking for application completion, and getting the results from said application back into the project organizer program 400. During the application process time the user will interact with the application to perform functions related to that application. The ACTIVE (INTERACTIVE) step forces the user to interact within its process. Table 2: Line 6 indicates that a sub-class of DATA SOURCE steps are defined and utilized within the present invention for define a source for a data input, connecting the data source with a specific file name or data stream available through the operating system or through an attached network. The DATA SOURCE step sub-class functions to define viable data sources for other steps and for the project organizer program 400.

Figure 6:
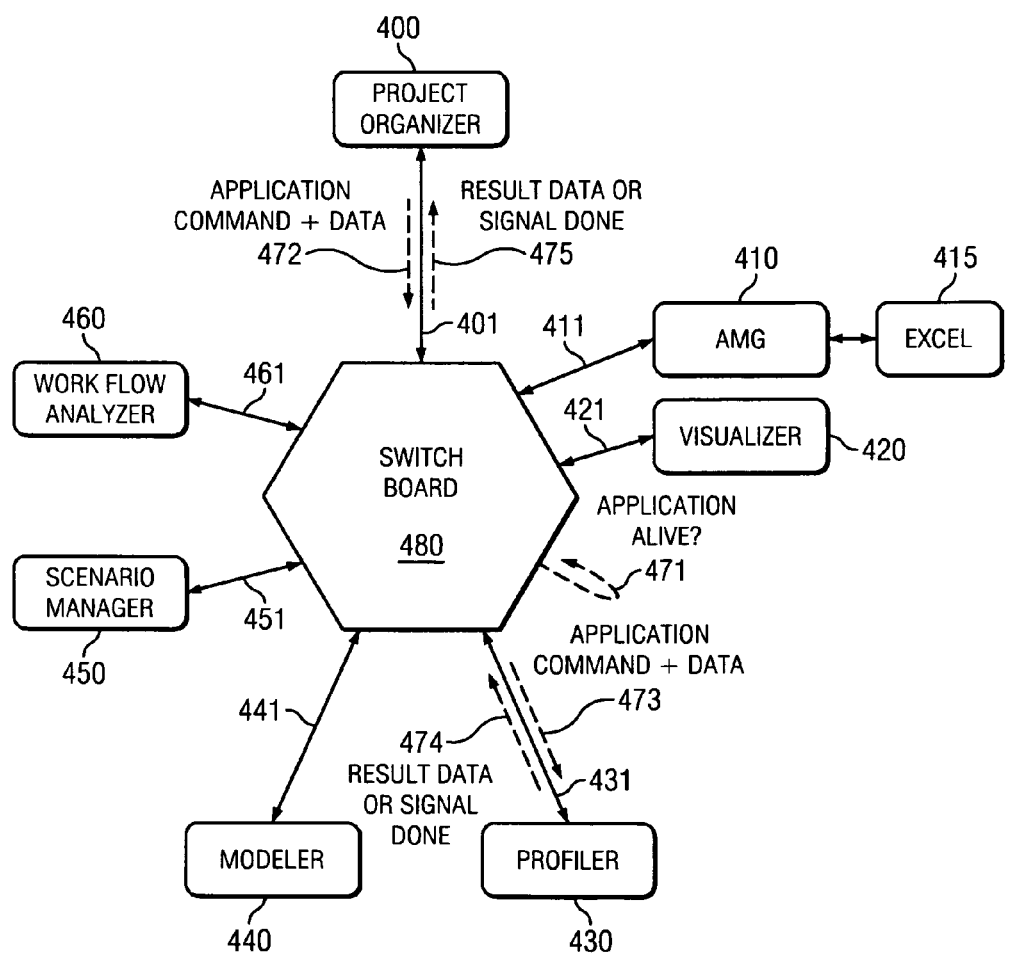
FIG. 6 is a block diagram describing a network of applications interacting with a switchboard device and the project organizer program in the preferred embodiment of the present invention.

FIG. 6 shows a preferred embodiment of the mode of use of the present invention. Project organizer program 400 for organizing and managing complex projects is connected to switchboard 480. Switchboard 480 is a program device for managing the intercommunications of and the execution of any number of external applications that are logically connected to it, acting as a translator between the applications and to hold data and or coordinate data transfers between the applications. In FIG. 6, switchboard 480 is connected to applications Application Model Generator (AMG™) 410 for modeling the application performance within a system, Visualizer™ 420 for creating reports from stored data and displaying the results, Profiler™ 430 for profiling measured data from a system or network, Modeler™ 440 for simulating scaled performance of applications on a production system, Scenario Manager™ 450 for scheduling a multiplicity of simulation runs and Workflow Analyzer™ 460 for analyzing the application job flow within a system or network. AMG™, Visualizer™, Profiler™, Modeler™, Scenario Manager™ and Workflow Analyzer™ are all software applications related to performance analysis of business functions and applications on distributed computer networks and enterprise systems and are available from Hyperformix, Inc. of Austin, Tex.

Connections 401, 411, 421, 431, 441, 451, and 461 are communications channels for signaling and information flow between switchboard 480 and the applications, 400, 410, 420, 430, 440, 450 and 460 respectively. Switchboard 480 is required because each application may utilize a unique protocol for communication. Rather than have each application be aware of all other application's protocols in order to affect a direct connection, switchboard 480 is made aware of each application's protocol and performs the appropriate conversions so that any two applications may be interconnected. Furthermore switchboard 480 will accept a command and data transfer request from a client, and if the target application is not running, hold the data in a buffer, wake up the application. When the application is running, switchboard 480 will then send the client command and transfer the data from its buffer to the application.

As steps within a given recipe are executed within project organizer program 400, a given step may require communication with a given external application to complete a task. Subsequent information flow between the step and the external application occurs via the project organizer program 400 and switchboard 480.

An example of information flow between project organizer program 400 and Profiler™ 430 is indicated in FIG. 6 to show and example of the signaling process. Project organizer program 400 sends a profiler command with data 472 to switchboard 401 via connection 431. Switchboard 480 receives data 472 via connection 401, examines the command within data 472 and determines that the command is intended for Profiler™ 430. Switchboard 480 verifies that Profiler™ 430 is available by sending an "application alive?" query 471 to Profiler™ 430 via connection 431. The "application alive?" query polls the available lists of running software on the operating system to determine if the desired application is registered. If Profiler™ 430 is not registered, then switchboard 480 will launch Profiler™ 430. Once Profiler™ 430 is available, switchboard 480 packages the data into correct protocol for Profiler™ 430 and sends the packaged data 473 to Profiler™ 430. Profiler™ 430 receives data 473, allows a user to manipulate the received data 473 according to the application's functions, and upon completion sends the requested result data 474 back to project organizer program 400 via connection 431. The result data 474 is received by switchboard 480, discovers that it is intended for project organizer program 400, repackages it according to the correct protocol and sends the packaged result data 475 to project organizer program 400 via connection 401. If Profiler™ 430 is not available upon query 471 then switchboard sends a message to project organizer program 400 to that effect.

Some applications may simply send a "task done" signal back to the Project Organizer program 400 indicating that it completed the task and deposited the output data in a file that was specified in the initial task command. An example is shown in FIG. 6, where AMG™ 410 has deposited a Microsoft Excel™ file 415 in a particular location after completing a previous task from project organizer program 400.

Figure 7:
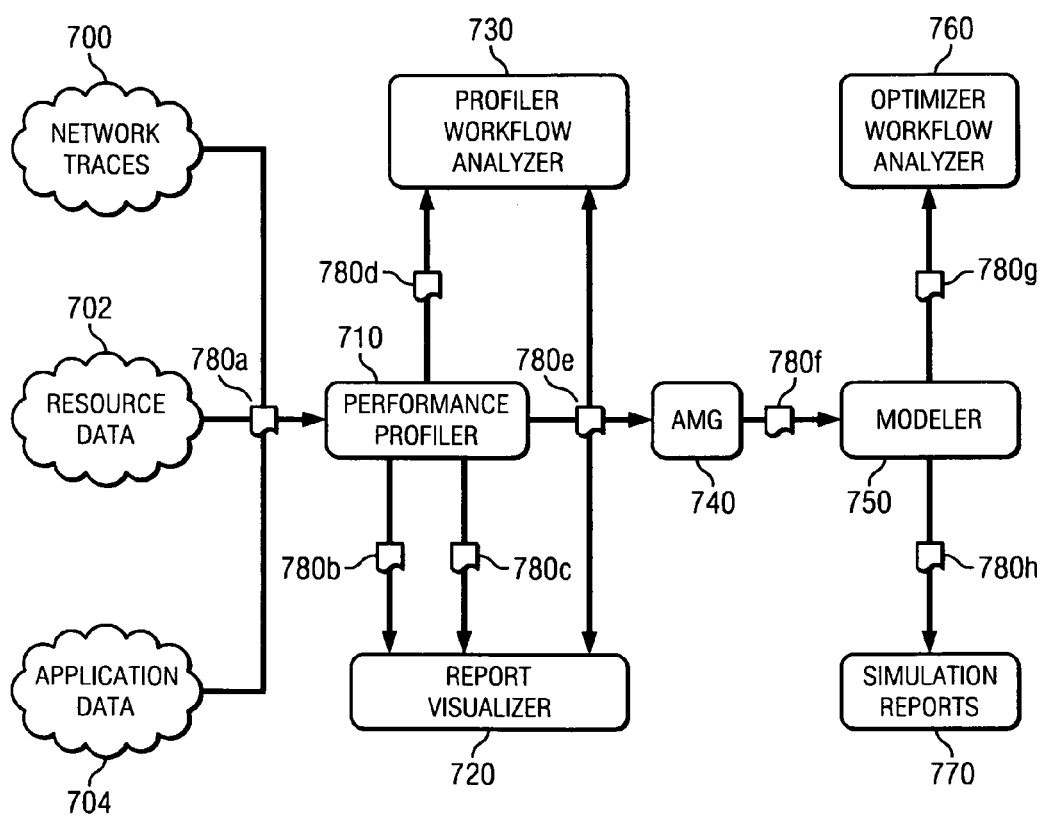
FIG. 7 is a block diagram illustrating a mode of use of the presentation invention.

A more specific example of the mode of use of the preferred embodiment is described using FIG. 7 which illustrates an instance of project organizer program 400 mode of use. This figure shows the workflow and the tools that are used to perform a network state capture, to analyze that data, and to simulate a model built on that data. This figure is actually the user interface to Hyperformix, Inc. product sold under the trademark "Dashboard". Tools are shown in rounded rectangular shapes, the workproducts (reports) 780 are shown as small icons shaped as "pieces of paper," and the flow of the workproducts is shown by arrows. The workflow is basically from left to right. Note that the main primary characterization of this representation is that it is tool-centric; there is very little specific support given for reaching a particular goal.

The process starts with the clouds on the left. These represent the previously collected sets of data including network traces 700 depicting network traffic, resource data 702 which include things like server utilizations and I/O activity, and application traces 704 which define high level transactions. These are assumed to be captured in a set of files 780a. These trace files 780a are loaded into Profiler™ 710 where the user analyzes said trace files, using features of Profiler™ 710 to generate a standardized network trace 780d, a transaction report 780e, a network summary 780b, and a possible resource summary 780c. These various reports can be viewed in certain ways (for example, tabular or a diagram) by the Profiler Workflow Analyzer™ 730 and Report Visualizer™ 720. The transaction report 780e becomes an input to the AMG™ 740. In AMG™ 740, users can specify properties and change values using AMG™ 740 features, and eventually generate simulation information 780f. The simulation information 780f may then be imported into the simulation user interface which is engine Modeler™ 750. This simulation information 780f may be adorned and specified further using Modeler™ 750 features, then run to produce a statistical results report 780h and a simulation trace 780g, logging simulation traffic. The simulation results may be conveniently viewed by the simulation reports 770. The simulation trace may be viewed in a diagram using the Optimizer Workflow Analyzer™ 760.

The previous example has been captured as a template within the project organizer program 400. Referring to FIG. 8, a screen shot of a project window 800 to open templates within the project organizer program 400 is shown. The window is composed of a set of tabs, projects tab 820, templates tab 830, and wizards tab 840, a set of controls 845 and a list of available templates 801-808. A user interested in setting up a Dashboard™ recipe will choose the Dashboard™ template 801 which shows its filename and a brief description. Templates vary considerably in complexity, for example the Dashboard™ recipe consists of 13 (thirteen) steps. The System-Scalability template consists of nearly 500 steps and represents the management of a very complex process.

The wizards tab 840, if selected, will bring up a project wizard that will lead a user through the correct selection of a project template and upon that selection lead the user through a process of filling in necessary supporting information to tailor the recipe to specific situations.

For example, if the Dashboard™ template 801 is selected, the Dashboard™ recipe is loaded into the recipe builder function 335 and the step tailor function 330 process is performed to further define the step parameters. Alternatively, the user may utilize the project wizard to further define step parameters.

Figure 9A:
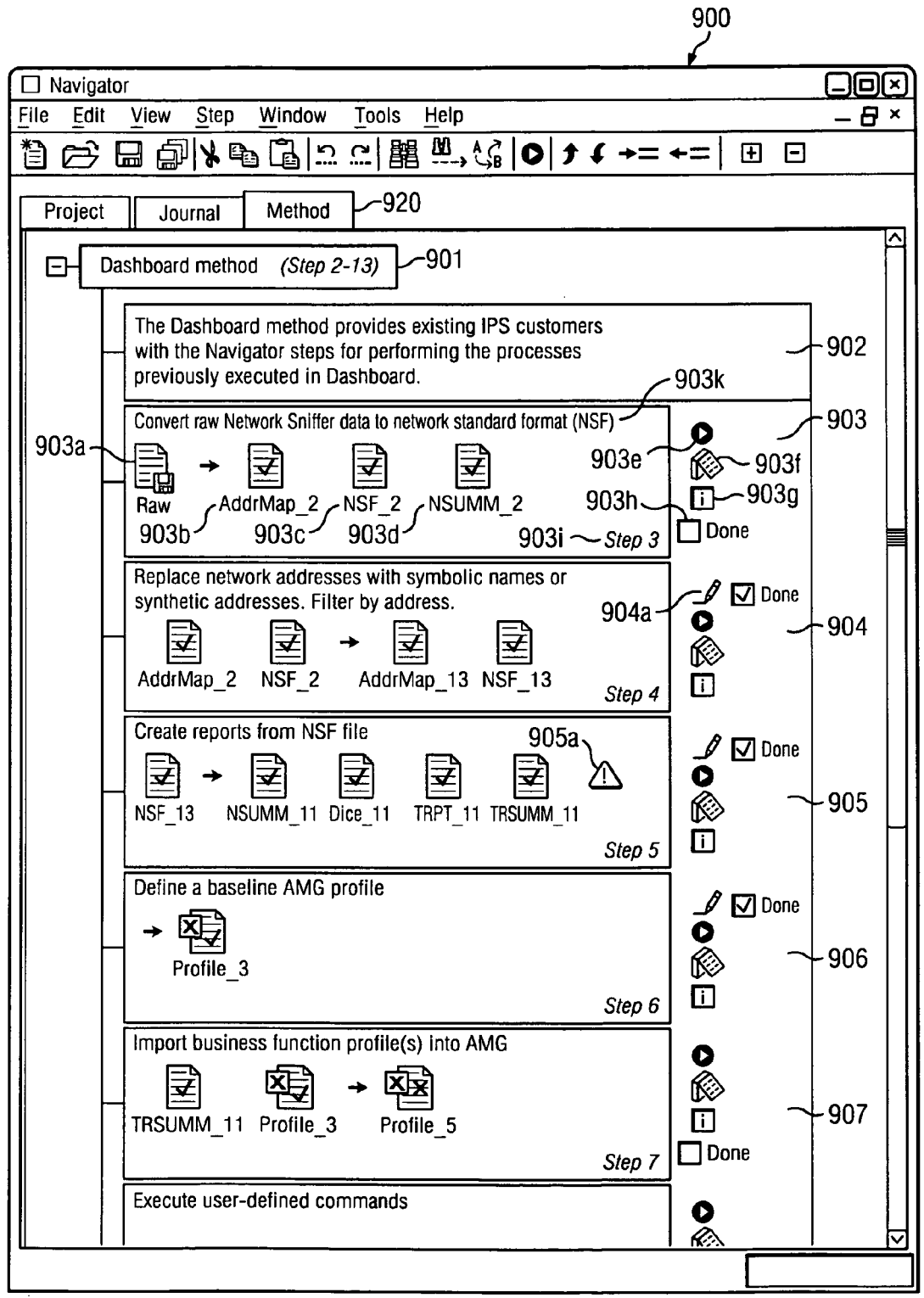
FIG. 9A, 9B, & 9C is a group of screen shots from a computer display illustrating the STEPS within a particular application generated by a preferred embodiment of the present invention.
Figure 9B:
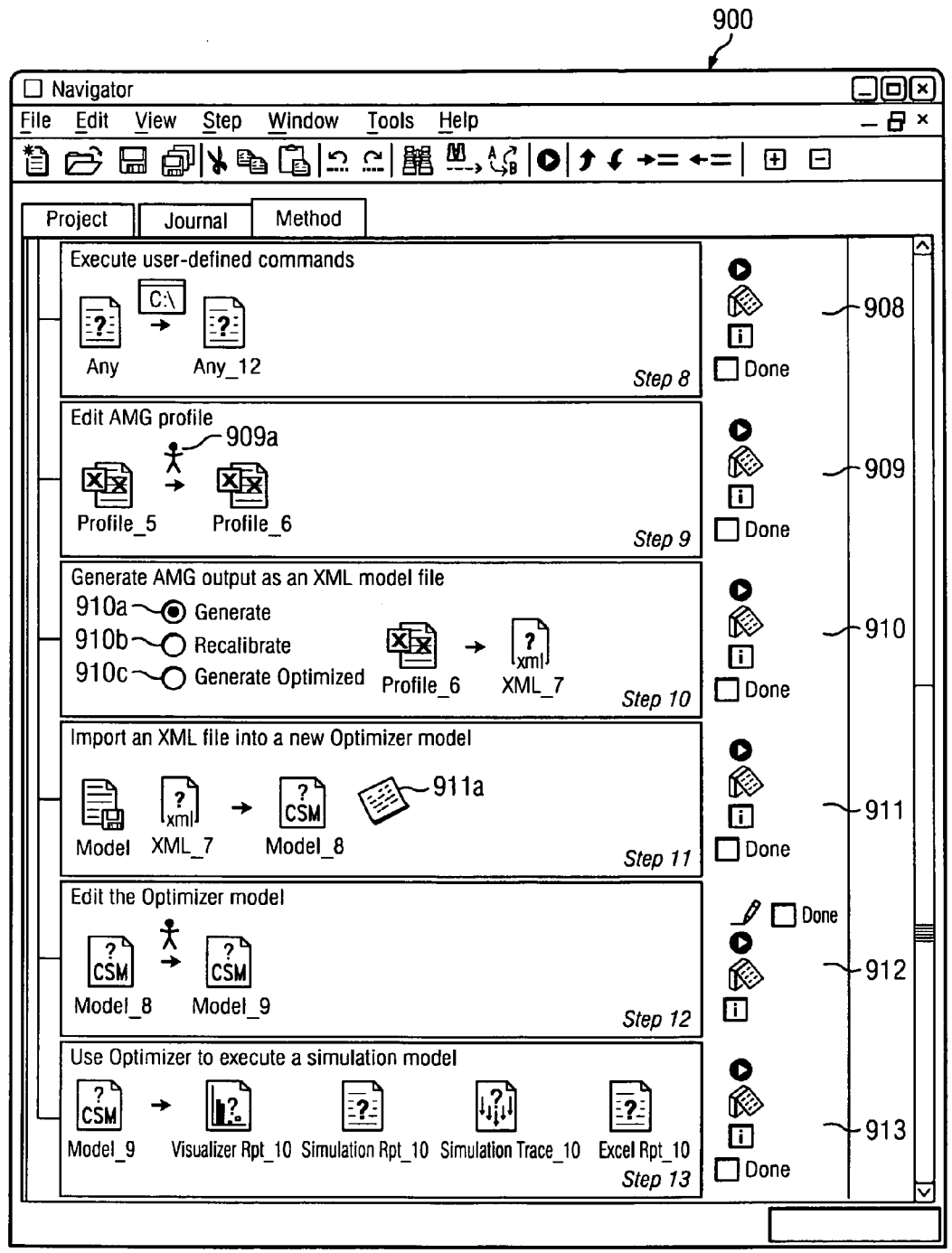

FIG. 9A shows a screen shot 900 from a preferred embodiment of the project organizer program 400 of the present invention. Screen shot 900 is produced by method tab 920 which invokes a preferred embodiment of recipe builder function 335 and step tailor function 330. The recipe of steps 901 through 913 are shown in FIGS. 9A and 9B serve as an example of step behavior and the combining of steps to form a recipe to solve a project oriented problem within the present invention.

The screen shot 900 displays the exemplary Dashboard™ method template 801 by utilizing the project window 800 (shown in FIG. 8). The following is a description of the Dashboard template by step as shown in FIGS. 9A and 9B:

Step 901. Every method starts with a root step. The first step is always a STATIC text step and the step is used to display the kind of the template. Text steps are passive in that they are there just to show information to the user. They do not do anything active. Method designers can change the text, the font, the color, and other appearances (using HTML tags).

Step 902. The second step is also a STATIC text step. Here it just provides a very brief description of the purpose of this template. In this case, the template was designed to help users of a previous product (Dashboard) to migrate to using Navigator.

Step 903. This ACTIVE (INTERACTIVE) step is a "convert from raw" step, which takes 1 or more raw network trace files and invokes the Profiler engine to convert these inputs into a standard format (defined by Profiler). The input to this step is shown as icon 903a that looks like a document with disk. In this step, the designer has set the input to let the user choose the trace files from some disk location. Almost all steps of all kinds can have one of their inputs "overridden" so that they can point to disk files instead of automatically pick up their data from previous steps. In this case, there is no previous step to supply data. The designer might have instead explicitly inserted a DATA SOURCE step and let this "convert from raw" step to automatically pick up its output(s) as feeding this step.

The outputs from this step indicated by icons 903b, 903c and 903d, respectively are a global, shared address map (explained in more detail in the next paragraph), an NSF (network standard format) file, which shows the packet level network activity, and a NSUMM (network summary), which shows summary counts for the network traffic, broken down by network address. The green checks over the icons 903b, 903c and 903d indicate the outputs have been verified and are valid. Other file icons through out the recipe will have red x's or question marks on them indicating that the associated files are not valid or undefined, respectively.

Also indicated in Step 903 are a set of controls, a "go" control 903e for causing execution of the step, a "notes" control 903f for creating a memo attached to the step, an "info" control 903g for obtaining help with the functioning of the step, a "done" checkbox 903h which displays a green check when the step has completed successfully, and a "step number" indicator 903i which shows the step sequence number. Shown in the next step is a "text input" control 904a for obtaining text from a user to utilize in the step function. Step label 903k is a definable label for Step 903.

Step 904. This DATA DEFINITION step allows users to supply symbolic names for each of the IP addresses found in the network trace. It takes the network trace and the original address map as input and creates a new address map and network trace as output. The new trace will use the names supplied by the user. In this step, there is a dialog to let the user specify what happens during the mapping. The dialog shows a table with one column being the raw IP, the second column being any new, arbitrary name, and the third column of checkboxes that say "allow through." So this step will also filter out any traffic that the user deems as "noise."

Step 905. This ACTIVE (INTERACTIVE) step takes the input network traffic (NSF) and creates all of the higher level abstract reports from it: a network summary (NSUMM), a transaction report (TRPT), a transaction summary (TRSUMM), and a dice file. The purpose and interpretation of each of these reports is not discussed here. Note that in this case, the step was executed to create these reports, and there was a warning to the user, as indicated by the caution icon 905a on the right of the step. If the user double-clicks on this icon, the warning message will be shown.

Step 906. This ACTIVE (INTERACTIVE) step takes no input and produces a base line AMG™ profile as output. As part of this step's edit properties, the user supplies a model name. When the step is run, AMG™ is launched and opened on a new document. The model name is set in that document. The user is free to customize that document within AMG™, then save said document (as the baseline).

Step 907. In this ACTIVE (NON-INTERACTIVE) step, the transaction report and the baseline AMG™ profile are imported an merged to create a new working AMG™ profile. This is a non-interactive step, as indicated by the lack of an "edit" button.

Step 908. This ACTIVE (NON-INTERACTIVE) step is actually not part of the original Dashboard™ template as was inserted into the project just to show a step which can be very heavily customized by the designer with respect to its inputs, outputs, and behavior. The step simply makes a call to the operating system to run a script or program as defined by the step designer.

Step 909. This ACTIVE (INTERACTIVE) step takes the newly merged AMG™ profile and allows the user to edit it in AMG™ when run. This creates a new profile that is used later in this project. This is basically an interactive step which will pause while the user edits the profile in whatever way they deem fit to adjust the transaction names, sizes, etc within AMG™. Once they save that profile, Navigator will manage it. Steps which are basically an "interactive escape" into a particular tool are usually shown with the "little blue guy" 909a above the arrow on the step.

Step 910. This ACTIVE (NON-INTERACTIVE) step takes the given AMG™ profile and exports that information so that it later can be brought into a Modeler™ model. The three options that control the export are shown as radio buttons 910a, 910b and 910c on the step itself.

Step 911. In this ACTIVE (INTERACTIVE) step the exported AMG™ profile is imported along with the input Modeler™ model, and the resulting model is saved as a new Modeler™ model. The input model is chosen by the user from disk, as evidenced by the document with disk icon on the first input. Note that this step demonstrates why it is important to merge data and inputs and create a new output rather than just modifying the original. By processing this way, Navigator methods (recipes) allow the user to backtrack through information to check that the calculations and assumptions were correct. This step also shows the appearance of a yellow "sticky note" 911a, which allows users to attach arbitrary text information to any step.

Step 912. Step 912 shows an ACTIVE (INTERACTIVE) edit session where the user can touch up the model in any way required. This step will take the input, make a copy of that as the output and will launch Modeler™ and load it with that model. The user simply has to make any changes and save. Navigator will wait with a "paused dialog" until the user dismisses it, indicating that the editing session is complete.

Step 913. The last ACTIVE (INTERACTIVE) step invokes Modeler™ to actually run a simulation and to generate the simulation reports as outputs. In this case, the running simulation produces a Visualizer report with charts and tables, a simulation statistics report, a simulation trace showing activity, and a nicely formatted statistics report for viewing in Excel. The user can view most reports from most steps by right-clicking and bringing up a context menu that has a list of possible viewers. Viewers depend on the kind of report but are often text editors, Excel for tables, Visualizer for more complex data, Excel applications, and built-in dialogs that are part of a particular step.

Figure 9C:
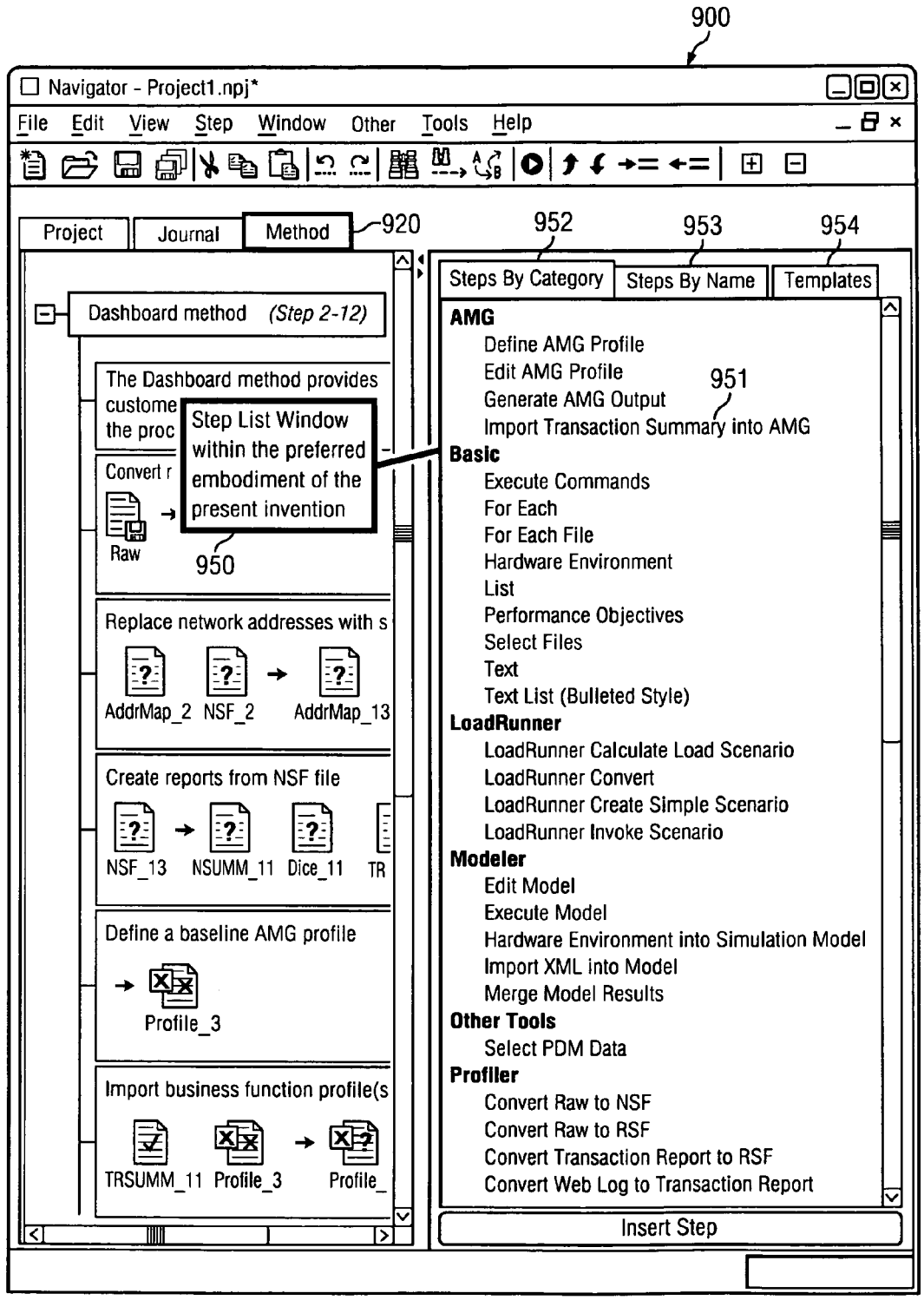

FIG. 9C shows a second screen shot 901 generated by a preferred embodiment of the invention. In this figure, step list window 950 is opened on the right. Step list window 950 is a preferred embodiment of step list function 325. As an example, a step sub-class "Import Transaction Summary into AMG" 951 is defined. If a step designer wishes to include step sub-class 951 in a recipe the step designer would click on the text "Import Transaction Summary into AMG" and a step would appear in the method module 920 window where the designer could further interact with the said step to further define its properties, such as input files and output files. Note that the user may utilize tabs 952, 953 to sort the step list by category or by name. Tab 954 may be utilized to access a template window for selecting templates.

While this invention has been described in reference to a preferred embodiment along with other illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

The invention claimed is:

1. A non-transitory computer readable medium containing a set of computer executable instructions executable on a processor connected to a computer network to produce a simulation model of the computer network to affect a solution for a systems performance engineering problem, wherein the computer network provides a set of network traces representing data traffic on the computer network, a set of resource data related to a set of computers connected to the network, and a set of application traces produced by a set of applications running on the set of computers, wherein the set of computer executable instructions, when executed by the processor, perform the steps of:

providing a data profiler module, running on the computer network, the data profiler module configured to receive and standardize the set of network traces, the set of resource data and the set of application traces into a standardized data set;

providing a modeler module, running on the computer network, the modeler model configured to receive the simulation model;

providing a model generation module, running on the computer network, the model generation module configured to receive the standardized data set from the data profiler module;

providing a switchboard module, running on the computer network, connected to the data profiler module, the modeler module, and the model generation module;- providing a project organizer module, running on the computer network connected to the data profiler module, the modeler module, and the model generation module through the switchboard module, the project organizer module operable to design a recipe directed toward the solution for the systems performance engineering problem, the recipe including a set of steps, wherein each step of the set of steps comprises step behaviors and step properties and is executable to perform a defined task related to the solution, the project organizer module further operable to perform:
- a step tailor function configured to set one or more step behaviors and one or more step properties of a step of the set of steps;
- a step recipe building function configured to organize the set of steps into the recipe;
- a step control function configured to use the recipe to execute the set of steps, wherein the execution of the set of steps comprises communicating commands to the data profiler module, the modeler module, and the model generation module through the switchboard module;
- a step list function configured to provide the set of steps to the recipe building function; and
- a plug-in facility function configured to provide a list of steps to the step list function and the one or more step behaviors and the one or more step properties to the step tailor function;

converting, by the switchboard module, a protocol of the commands communicated from the project organizer module, for distribution to the data profiler module, the modeler module, and the model generation module, to match protocol requirements of the data profiler module, the modeler module, and the model generation module;

generating, by the model generation module, the simulation model of the computer network in response to one or more of the commands communicated from the project organizer module through the switchboard module using the standardized data set provided by the data profiler module;

generating, by the modeler module, a simulation report using the simulation model generated by the model generation module.

2. The computer readable medium of claim 1 further comprising:
a step repository module for storage of a set of step subclasses logically responsive to a signal from the plug-in facility function.

3. The computer readable medium of claim 1 further comprising:
a step class, from which all steps have a derived behavior, having a predefined number of subobjects that define an input data type and an output data type; and
at least one display object.

4. The computer readable medium of claim 3 wherein the derived behavior further comprises:
a number of inputs;
a number of outputs;
a type of inputs;
a type of outputs;
a location where a set of persistent data resides;
an edit dialog for at least one set of step properties; and,
an edit dialog for at least one set of step behaviors when at least one of the set of steps is executed.

5. The computer readable medium of claim 4 wherein the plug-in facility function further functions to:
load a list of step subclasses into the step list function;
create a step subclass instance in conjunction with the step tailor function based upon a user selection of a step subclass from the list of step subclasses; and,
respond to a signal from the step control function by executing at least one of the set of steps.

6. The computer readable medium of claim 1 wherein the step list function further functions to:
compile a set of information related to a set of step subclasses from the plug-in facility function;
interface with a user to select a step from the set of steps;
signal the plug-in facility function as to the step selected; and,
communicate with the recipe building function as to the step selected.

7. The computer readable medium of claim 6 wherein the set of subclasses is drawn from the group of:
static information representation;
data definition;
iteration control;
active noninteractive;
active interactive; and,
data source.

8. The computer readable medium of claim 1 wherein the recipe builder function further functions to:
provide a display of at least one of the set of steps;
interface with a user to allow an arrangement of the set of steps into a recipe; and,
where the arrangement of the set of steps further comprises a tree.

9. The computer readable medium of claim 8 wherein the tree further comprises a hierarchal arrangement of the set of steps with a set of substeps.

10. The computer readable medium of claim 9 wherein the recipe builder function further functions to assign a birth order and an execution order to the set of steps and the set of substeps to facilitate rearrangement of the set of steps and the set of substeps.

11. The computer program readable medium of claim 1 wherein the step tailor function further functions to:
interface with a user to allow modification of the set of step behaviors through a properties window.

12. The computer readable medium of claim 11 wherein the step tailor function further functions to create an instance of at least one of the set of steps and populate the instance of at least one of the set of steps with a set of user supplied information.

13. The computer readable medium of claim 11 wherein the properties window is chosen from the group of a design form and a user form.

14. The computer program readable medium of claim 1 wherein the set of steps of the recipe comprises:
a first step and a second step and wherein an output file of the first step serves as an input file to the second step.

15. The computer program readable medium of claim 14 wherein the set of steps of the recipe comprises a third step and wherein an output file of the first step is an input file to the third step.

16. The computer readable medium of claim 14 wherein the output file of the first step is associated with a tracking label.

17. The computer readable medium of claim 1 wherein the step control function further functions to:
allow user interaction with at least one of the set of steps in one of the group of manual mode, automatic mode, semi-automatic made and by interaction with the step tailor function to allow designation of an input data source for the at least one step of the set of steps.

18. The computer readable medium of claim 17 wherein the step control function further functions to:
control an iteration count of the steps to support repeated execution of a step behavior.

19. The computer readable medium of claim 1 wherein the step control function further functions to:
validate an input file to one or more of the set of steps and display a validation indicator to a user upon validation of the input file.

20. The computer readable medium of claim 1 wherein each step of the set of steps has at least one function and where the functions of each step are drawn from the group of a load function, a create inputs function, a create outputs function, a show edit dialog function, a display yourself function, a go execute function, a show design dialog function and a read and write to project file function.

21. A distributed computer system configured to run a computer network simulation of a computer network to affect a solution for a systems performance engineering problem, the computer network producing a set of network traces representing data communicated between a set of computers connected to the computer network, a set of resource data related to the set of computers, and a set of application traces related to a set of applications running on the set of computers, the distributed computer system comprising:
a project organizer module, running on the set of computers, configured to design a recipe directed toward the solution for the systems performance engineering problem, the recipe comprising a reusable group of related process steps, wherein each step of the reusable group of related process steps comprises step behaviors and step properties and is executable to perform a defined task related to the solution, the project organizer module further configured to perform:
a step tailor function operable to set one or more step behaviors and one or more step properties of a step of the reusable group of related process steps;
a step recipe building function operable to organize the steps into the recipe;
a step control function operable to use the recipe to execute the reusable group of related process steps, wherein the execution of the reusable group of related process steps comprises communicating commands via a connection to a switchboard module of the distributed computer system for distribution to a plurality of user applications of the distributed computer system;
a step list function operable to provide the reusable group of related process steps to the recipe building function; and
a plug-in facility function configured to provide a list of steps to the step list function and the one or more step behaviors and the one or more step properties to the step tailor function; the plurality of user applications including:
a profiler module configured to receive and standardize the set of network traces, the set of resource data and the set of application traces into a standardized data set,
a model generation module configured to receive the standardized data set from the profiler module, and further configured to generate the computer network simulation model using the standardized data set in response to one or more of the commands communicated from the project organizer module through the switchboard module,
a modeler module configured to execute the computer network simulation model and produce a simulation report, and
a visualizer module for observing a behavior of the executed computer network simulation model;
the switchboard module being configured to manage communications between the project organizer module and the plurality of user applications and is further configured to format the commands from the project organizer module according to a protocol determined by at least one user application of the plurality of user applications and further distributes the formatted commands to the at least one user application of the plurality of user applications.

22. The distributed computer system of claim 21 wherein each of the plurality of user applications has an active and an inactive state and the switchboard application further functions to survey an activation state of the plurality of user applications and upon receipt of a signal indicating no activation, activating one or more of the user applications.

23. The distributed computer system of claim 21 wherein:
the reusable group of related process steps are related in a hierarchal order;
the reusable group of related process steps encapsulate at least one runtime method and at least one data source; and,
wherein at least one step of the reusable group of related process steps accesses a data repository for storage of data used in the at least one runtime method.

24. The distributed computer system of claim 21 wherein:
the project organizer module executes the reusable group of related process steps; and,
stores a set of information related to the execution of the reusable group of related process steps in a journal log file.

25. The distributed computer system of claim 21 wherein the project organizer module maintains a set of bookkeeping information.

26. The distributed computer system of claim 21 wherein the project organizer module maintains a set of common support data.

27. A method of solving a computer network simulation problem in a computer network system, the computer network system including a set of computers connected in a network and generating a set of network traces representing data traffic on the network, a set of application traces produced by a set of applications resident on the set of computers, and a set of resource data indicating hardware metrics from the set of computers, comprising the steps of:
providing a performance profiler application, resident on the computer network, configured to receive and standardize the set of network traces, the set of application traces and the set of resource data into a standardized data set;
providing a model generation application, resident on the computer network, configured to receive the standardized data set from the performance profiler application;
providing a modeler application, resident on the computer network;
providing a switchboard application, resident on the computer network, configured to manage communications between the performance profiler application, the model generation application and the modeler application;
providing a project organizer program, connected to the performance profiler application, the model generation application and the modeler application through the switchboard application, the project organizer program programmed to carry out the further steps of:
designing a recipe in a design framework function directed toward a solution for the computer network simulation problem, the recipe comprising a required set of steps, wherein each step of the required set of steps comprises step behaviors and step properties and is executable to perform a defined task related to the solution
using the recipe to execute the required set of steps, wherein the execution of the required set of steps comprises communicating commands through the switchboard application to the performance profiler application and the model generation application, whereby a first computer network simulation model is generated by the model generation application using the standardized data set provided by the performance profiler application;
altering the recipe in a change process to create an altered recipe comprising an altered set of steps;
using the altered recipe to execute the altered set of steps, wherein the execution of the altered set of steps comprises communicating commands through the switchboard application to the performance profiler application and the model generation application, whereby a second computer network simulation model is generated by the model generation application using the standardized data set provided by the performance profiler application;
submitting the first computer network simulation model to the modeler application to generate a first simulation report; and
submitting the second computer network simulation model to the modeler application to generate a second simulation report; and
using the first simulation report and the second simulation report to affect the solution for the computer network simulation problem.

28. The method of claim 27 wherein the step of using the recipe comprises the further steps of:
utilizing a step control means to perform the execution of the required set of steps in a hierarchal order; and,
enforcing an information flow between the required set of steps.

29. The method of claim 27 wherein the change process further comprises the steps of:
saving a project from a capture project function; and,
using the saved project to redesign the recipe.

* * * * *